Oct. 24, 1944. M. SCHLUMBERGER 2,361,064
DEPTH MEASURING APPARATUS
Original Filed Aug. 20, 1938

INVENTOR.
MARCEL SCHLUMBERGER
BY
Hoguet, Neary & Campbell
ATTORNEYS

Patented Oct. 24, 1944

2,361,064

UNITED STATES PATENT OFFICE 2,361,064

DEPTH MEASURING APPARATUS

Marcel Schlumberger, Haute-Garonne, France, assignor, by mesne assignments, to Schlumberger Well Surveying Corporation, Houston, Tex., a corporation of Delaware Original application August 20, 1938, Serial No. 225,951, now Patent No. 2,332,348, dated October 19, 1943. Divided and this application December 29, 1942, Serial No. 470,447. In France June 28, 1938

7 Claims. (Cl. 33—126.5)

The present invention relates to apparatus for determining depths, and more particularly to improved apparatus for accurately determining distances in a bore hole from a given reference point therein.

This application is a division of my copending application for "Method and device for referring a level in a bore hole to the bottom of said bore hole," Serial No. 225,951, filed August 20, 1938, now patent number 2,332,348, dated Oct. 19, 1943.

In the present practice, the depth of a bore hole is usually determined by lowering a plummet on a cable to the bottom of the bore hole, and measuring either the length of cable paid out or the length of cable taken up in raising the plummet to the surface. Likewise, where the bore hole depth is known, and it is desired to locate apparatus such as a gun perforator in the bore hole at a given distance from the top or bottom thereof, this is often accomplished by lowering the apparatus on a cable to the bottom of the bore hole and taking up a length of cable equal to the distance of the desired location from the bottom of the bore hole.

These methods, however, have been found to be generally unsatisfactory because of the difficulty involved in determining the exact moment when the plummet engages or leaves the bottom of the bore hole.

An object of the present invention, accordingly, is to provide improved apparatus for determining depths in a bore hole in which a signal is initiated at the instant the plummet leaves its initial position in the bore hole, thus enabling depth measurements to be made with great accuracy.

Another object of the invention is to provide improved signalling apparatus for mechanically initiating a signal when the plummet engages or leaves the bottom of the bore hole.

Additional objects and advantages of the invention will appear from the following detailed description of a representative embodiment taken in connection with the accompanying drawing, in which.

Figure 1:
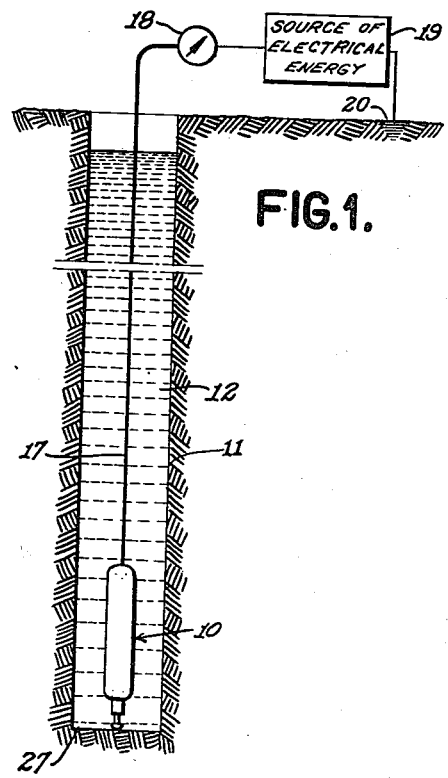
Figure 1 is a schematic diagram of apparatus constructed according to the invention, shown in operative position in an uncased bore hole.
Figure 3:
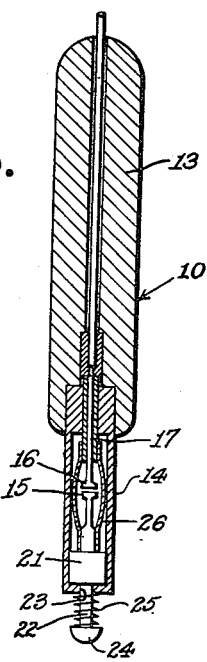
Figure 3 is an enlarged view in longitudinal section illustrating in detail the signalling apparatus shown in Figures 1 and 2.

Referring now to Figure 1, sounding apparatus 10 constructed according to the invention is shown disposed at the bottom of a bore hole 11 containing a column of conducting liquid 12. As shown in greater detail in Figure 3, the apparatus 10 may comprise a plummet 13 of any suitable type, at the lower end of which is mounted a cyl'ndrical casing 14 within which are disposed two spaced apart switch contacts 15 and 16. The upper switch contact 16 is connected to an insulated conductor 17 in the supporting cable, the upper end of which is connected in series with one terminal of any suitable means for indicating an interruption of the flow of current in the circuit, such as for example, a conventional milliammeter 18. The other terminal of the milliammeter 18 is connected to one terminal of a suitable source of electrical energy 19, the other terminal of which is grounded at the point 20 at the surface of the earth.

The lower switch contact 15 in the casing 14 is secured to a piston member 21 which is slidably mounted within the casing 14. Secured to the lower end of the piston 21 is an actuator member 22 which extends through an aperture 23 in the lower wall of the casing 14 and which terminates in a laterally extending member 24. The sw'tch contacts 15 and 16 are normally maintained open by means of a suitable biasing spring 25, the upper end of which engages the lower face of the casing 14 and the lower end of which engages the upper surface of the laterally extending member 24. The switch contacts 15 and 16 are enclosed within a sleeve 26 made of resilient material such as rubber, for example, forming a chamber which is filled with an insulating liquid.

If, for example, it is desired to determine the depth of the bore hole 11 with the apparatus described above, the apparatus 10 is lowered into the bore hole 11 until the laterally extending member 24 engages the bottom 27 thereof. So long as the laterally extending member 24 on the actuator member 22 does not engage a solid object, the switch contacts 15 and 16 are maintained out of engagement by the biasing spring 25. However, as soon as the laterally extending member 24 engages the bottom 27 of the bore hole 11, the actuator member 22 is forced upwardly against the compression in the spring 25 until the contacts 15 and 16 are in engagement.

The engagement of the switch contacts 15 and 16 closes an electrical circuit including the source of electrical energy 19, the milliammeter 18, the single conductor 17 in the supporting cable, the engaged switch contacts 15 and 16, the piston 21, the casing 14, the conducting bore hole liquid 12 and the intervening earth formations between the apparatus 10 in the bore hole and the ground 20 at the surface of the earth. The flow of this current is indicated by the milliammeter 18, providing a signal at the surface of the earth that the apparatus 10 is located at the bottom of the bore hole. The supporting cable is then pulled up at the surface of the earth.

Inasmuch as the supporting cable is elastic, it tends to stretch, so that the apparatus 10 does not immediately leave the bottom 27 of the bore hole 10. When the apparatus finally moves from its rest position, the spring 25 causes the switch contacts 15 and 16 to separate, breaking the electrical circuit. The interruption of the flow of current in the circuit is indicated by the milliammeter 18, providing a signal at the surface that the apparatus 10 has begun to move. From the instant the signal is received, the length of cable pulled up in raising the apparatus 10 to the surface of the earth is measured. Since the initial elastic elongation of the cable is eliminated from the measurement, this length, for all practical purposes, is equal to the depth of the bore hole 11.

Figure 2:
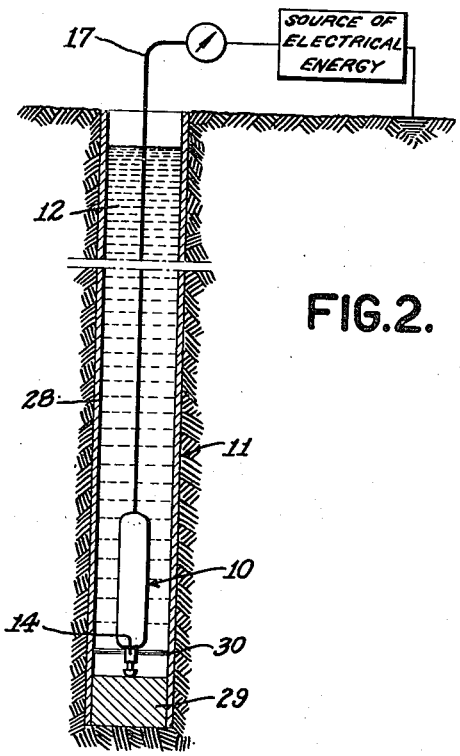
Figure 2 is a schematic diagram showing the apparatus of Figure 1 in position in a cased bore hole.

In the mode of operation illustrated in Figure 2 of the drawing, the bore hole 11 is provided with a metallic casing 28, the bottom of which may be closed off in the conventional manner by means of a cement plug 29. If the bore hole 11 contains a column of conducting liquid 12, the manner of operation is exactly the same as described above in connection with Figures 1 and 3. If, however, the liquid 12 is non-conducting or, if there is no liquid at all in the bore hole 11, the circuit may be closed by direct contact between the casing 28 and the apparatus 10. This may be accomplished for example, by mounting a conventional type wire brush 30, such as is disclosed in prior Patent No. 2,233,420 on the cylindrical casing 14, as shown in Figure 2.

Figure 4:
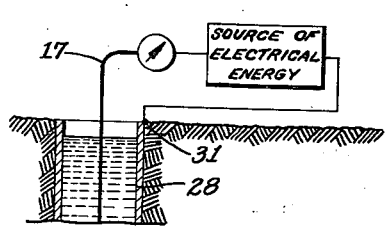
Figure 4 is a partial view illustrating a further modification of the apparatus shown in Figure 2.

If desired, the upper end of the conductor 17 may be directly connected to the casing 28 at the point 31, as shown in Figure 4.

Where bore hole apparatus, such as a gun perforator, for example, constitutes the plummet 13, and it is desired to locate such apparatus at a predetermined distance from the bottom of the bore hole 10, essentially the same procedure is followed. The only difference is that, after the signal is received at the surface, a length of the cable equal to the predetermined distance is pulled up, thereby positioning the apparatus at the desired level.

It will be understood from the foregoing description that the invention provides new and improved apparatus for providing a signal at the surface of the earth at the instant a sounding plummet leaves an initial point of reference such as, for example, the bottom of a bore hole. It thus enables depth measurements to be obtained in which errors produced by the elastic elongation of the supporting cable may be minimized.

In the foregoing description, the term "plummet" has been used to designate the load supported by the cable. It is to be understood that this load or "plummet" may be of any desired type and may be made of any suitable material. It is only necessary that it be heavy enough to insure that the cable will reach the bottom of the bore hole. Specifically, the "plummet" may comprise any apparatus used in bore hole operations such as, for example, a gun perforator.

While a specific embodiment has been described above, the invention is not intended to be in any way limited thereby, but is susceptible of numerous changes in form and detail within the scope of the appended claims.

I claim:

1. In depth determining apparatus, a signalling device comprising a frame adapted to be lowered into a bore hole, a flexible casing in the frame, switching means having spaceable switch contacts in the casing, one of said contacts being grounded to said frame, a single insulated conductor connected to another of said contacts and grounded at the surface of the earth, a source of electrical energy for energizing the circuit including said conductor, means responsive to the current flow in said circuit, and an actuator for said switching means, said actuator extending downwardly from the frame and being adapted to operate said switching means when it engages a solid object.

2. In an electric sounding apparatus for use in cased wells of considerable depth, a sounding weight adapted to be lowered into the metallic casing of the well; make-and-break electric switch means carried by said weight; a sounding line secured to said weight and comprising a single, insulated conductor connected in circuit with one side of said switch means, the other side thereof having an electrical connection through the said weight presenting an exposed contact on its outside adapted to be placed in circuit with the metallic casing; and means projecting outwardly from and movably associated with the said weight and constructed and arranged to operate the switch means when said projecting means encounters a solid object in the well.

3. In a system for electrically sounding oil wells having a metallic casing extending substantially throughout the depth thereof, the combination comprising a sounding weight adapted to be lowered into the metallic casing of the well; a make-and-break electric switch within said weight; a weight line consisting of a single insulated conductor connected at one end to one terminal of said switch, the other terminal of said switch having an electrical connection through said weight presenting an exposed contact on the outside of said weight adapted to be placed in circuit with the adjacent portion of the metallic casing; a switch-operating member projecting from said weight and movable with respect thereto constructed and arranged to operate the switch upon encounter with a solid object within the well casing; and current flow indicating means connected in circuit with the other end portion of the weight line conductor and the surface end of the metallic casing.

4. A sounding weight for use in oil wells or the like comprising electric switching means; conductors operatively associated with said switching means for controlling a source of current; a liquid-filled chamber in said weight containing said switching means; and means partially projecting from and slidably associated with the weight and arranged for opening and closing said switching means when slid by being brought into contact with an external object, said switch operating means having opposed portions arranged to be exposed to approximately the same hydrostatic pressure in the well or the like so as to counteract the tendency of the switch operating means to move in response to hydrostatic pressure on the part thereof which projects from the weight for engagement with an external object.

5. In depth determining apparatus, a signalling device comprising a body adapted to be lowered in a bore hole, said body having a chamber portion therein terminating in an opening at the lower extremity thereof, a contact member secured in the body and extending into the chamber, a movable member in the chamber having a contact thereon, both said contacts being enclosed within a flexible casing, and an actuator on the movable member and extending through the opening in the body for closing the contacts.

6. In depth determining apparatus, a signalling device comprising a body adapted to be lowered in a bore hole, said body having a chamber portion therein terminating in an opening at the lower extremity thereof, conductive means in the upper portion of said body, extending downwardly into the chamber and terminating in a contact element, a movable member in the lower portion of said chamber having an upwardly projecting portion terminating in a contact element, said conductive means and upwardly projecting portion being connected by a tightly fitted flexible enclosure containing an insulating liquid within which the said contact elements are disposed, said movable member having a portion extending downwardly through the opening in the body, and terminating in a laterally extended portion, and resilient means disposed between the body and said laterally extended portion for maintaining the contacts normally disengaged.

7. In depth determining apparatus, the combination of a body adapted to be lowered in a bore hole, said body having a chamber portion therein terminating in an opening at the lower extremity thereof, a contact member non-conductively secured in the body and extending into the chamber, a movable member in the chamber having a contact thereon, both said contacts being enclosed within a flexible casing containing insulating liquid, means extending through the opening in the body for actuating said movable member to close the contacts, resilient means associated with said actuating means for maintaining the contacts normally disengaged, an insulated conductor connected at one end to said first contact, its other end being grounded, a source of voltage in the circuit of said conductor, and current actuated means in said last named circuit for indicating whether said contacts are engaged or disengaged.

MARCEL SCHLUMBERGER.